US009922740B2

(12) United States Patent
Singh et al.

(10) Patent No.: US 9,922,740 B2

(45) Date of Patent: Mar. 20, 2018

(54) NUCLEAR POWER GENERATION SYSTEM

(71) Applicant: SMR Inventec, LLC, Marlton, NJ (US)

(72) Inventors: Krishna P. Singh, Hobe Sound, FL (US); Joseph Rajkumar, Cherry Hill, NJ (US)

(73) Assignee: SMR INVENTEC, LLC

(*) Notice: Subject to any disclaimer, the term of this patent is extended or adjusted under 35 U.S.C. 154(b) by 391 days.

(21) Appl. No.: 14/437,897

(22) PCT Filed: Oct. 25, 2013

(86) PCT No.: PCT/US2013/066777

§ 371 (c)(1),
(2) Date: Apr. 23, 2015

(87) PCT Pub. No.: WO2014/113115

PCT Pub. Date: Jul. 24, 2014

(65) Prior Publication Data

US 2015/0255181 A1 Sep. 10, 2015

Related U.S. Application Data

(60) Provisional application No. 61/718,309, filed on Oct. 25, 2012.

(51) Int. Cl.

*G21D 5/14* (2006.01)
*G21D 1/00* (2006.01)
(Continued)

(52) U.S. Cl.

CPC ............. *G21D 1/006* (2013.01); *G21C 13/10* (2013.01); *G21C 15/26* (2013.01); *G21D 5/14* (2013.01); *G21D 5/16* (2013.01); *Y02E 30/40* (2013.01)

(58) Field of Classification Search

CPC ........ G21C 15/24; G21C 15/26; G21D 1/006; G21D 1/04; G21D 5/08; G21D 5/12; G21D 5/14

(Continued)

(56) References Cited

U.S. PATENT DOCUMENTS 2,938,350 A 5/1960 Zimmermann
3,012,957 A * 12/1961 Spooner .................. G21C 1/08 122/32

(Continued)

FOREIGN PATENT DOCUMENTS

WO 2011097597 8/2011

OTHER PUBLICATIONS

Corresponding International Search Report for PCT/US2013/066777 dated Jul. 11, 2014.

*Primary Examiner* — Sharon M Davis

(74) *Attorney, Agent, or Firm* — The Belles Group, P.C.

(57) ABSTRACT

A nuclear power generation system and related power cycle are disclosed, in one embodiment, the system includes primary coolant circulation through a hydraulically interconnected reactor containing nuclear fuel and a steam generating vessel collectively defining a steam supply system. Liquid secondary coolant for the power cycle flows through the steam generating vessel and is converted to steam by the primary coolant to drive a low pressure turbine of a turbine-generator set. Steam exiting the turbine is condensed and heated prior to return to the steam supply system, thereby completing a secondary coolant flow loop. In one embodiment, a majority of the secondary coolant heating occurs within the steam generating vessel via heat exchange with the primary coolant rather than externally in the secondary coolant flow loop. This creates a temperature differential between the primary and secondary coolant sufficient to create natural thermally induced convective circulation of the primary coolant.

20 Claims, 6 Drawing Sheets

(51) Int. Cl.
*G21C 15/26* (2006.01)
*G21C 13/10* (2006.01)
*G21D 5/16* (2006.01)

(58) Field of Classification Search
USPC .......................................................... 376/211
See application file for complete search history.

(56) References Cited

U.S. PATENT DOCUMENTS

| | | | | | |
|---|---|---|---|---|---|
| 3,127,877 | A * | 4/1964 | Profos | E05B 63/048 122/406.4 |
| 3,244,598 | A * | 4/1966 | Rose | F22B 1/1823 376/391 |
| 3,575,807 | A * | 4/1971 | Ripley | G21D 1/04 261/118 |
| 3,576,179 | A | 4/1971 | Romanos | |
| 3,604,206 | A * | 9/1971 | Baily | F01K 7/44 277/432 |
| 5,457,721 | A | 10/1995 | Tsiklauri et al. | |
| 8,091,361 | B1 | 1/2012 | Lang | |
| 2007/0000250 | A1 * | 1/2007 | Chaki | G21C 1/084 60/644.1 |
| 2010/0124303 | A1 * | 5/2010 | Young | G21C 1/322 376/282 |
| 2010/0124306 | A1 | 5/2010 | Young | |

* cited by examiner

NUCLEAR POWER GENERATION SYSTEM

CROSS-REFERENCE TO RELATED PATENT APPLICATIONS

The present application is a U.S. national stage application under 35 U.S.C. § 371 of PCT/US2013/066777 filed Oct. 25, 2013, which claims the benefit of U.S. Provisional Patent Application No. 61/718,309 filed Oct. 25, 2012, the entireties of which are herein by reference.

FIELD OF THE INVENTION

The present invention relates to nuclear power generation systems, and more particularly to a steam supply system and related power cycle including natural thermally induced gravity flow of primary coolant through a reactor and steam generator.

BACKGROUND OF THE INVENTION

Commercial nuclear power generation plants in use as well as those thus far submitted for licensing approval in the United States and abroad are characterized by the following common features with respect of their power generation cycle (e.g. Rankine cycle). First, the motive steam produced which is used to drive the steam turbine is produced at a moderately high pressure with little or no superheat. Second, multiple trains of feedwater heaters are deployed to extract cycle steam at various points and pressures as the steam expands through the turbines (typically high pressure and low pressure turbine units) to pre-heat the condensate (i.e. condenses secondary coolant) before it is returned to the boiler (which may be the reactor itself or a tubular heat exchanger commonly known as the steam generator). Finally, in addition to the string of feedwater heaters, the cycle steam is also generally mechanically dewatered and reheated by the boiler steam (without mixing) in one or two stages in a rather large piece of equipment known as the moisture separator reheater or MSR.

The array of steam turbines, feedwater heaters, MSR, and associated piping, valves and instrumentation, typical of modern nuclear plants, are also a known source of reduction in the plant's reliability and increase in maintenance costs. Although the foregoing equipment mentioned may add perhaps one to two percent to the plant's thermodynamic efficiency, the concomitant increase in complexity, capital cost, and detriment to the plant's availability may be quite significant. In particular, the complexity of the power cycle detracts from the use of the nuclear plant as a variable power supply source for cyclical "load following" operation.

SUMMARY OF THE INVENTION

The present disclosure provides an improved nuclear steam supply system and optimized Rankine cycle which includes natural thermally induced gravity flow to circulate primary coolant through the steam generating and reactor vessels combined with a low pressure steam supply to the turbine-generator set, thereby advantageously eliminating the need for a high pressure turbine. In addition, embodiments of the present invention may include a single feedwater heater in the secondary coolant flow or piping loop external to the reactor vessel. This arrangement produces minimal heating of the liquid phase secondary coolant upstream and outside of the steam generator in the balance of plant, thereby maximizing the heat transfer rate from the primary coolant to the secondary coolant within the steam generating vessel. Advantageously, this results in a larger temperature differential initially between the primary coolant and secondary coolant in the steam generator because the bulk of the secondary coolant heating to produce steam for driving the low pressure turbine is accomplished within the steam generating vessel. This in turn enhances and increases the thermo-siphon effect mechanism of the natural convection-based gravity-driven primary coolant circulation system and rate of primary coolant flow, thereby advantageously eliminating the need for primary coolant pumps, as further described herein.

A natural convection driven reactor primary coolant loop coupled with an optimized simple steam cycle as disclosed herein is advantageously well adapted to load following operation, which heretofore has been impractical and problematic for modern large nuclear plants.

In one embodiment, a nuclear power generation system includes a steam generator including a steam generating vessel fluidly coupled to a reactor vessel having an internal cavity, a reactor core comprising nuclear fuel disposed within the internal cavity and operable to heat a primary coolant, a primary coolant flow loop formed between the reactor vessel and the steam generating vessel, the primary coolant flow loop being configured and operable to circulate primary coolant through the reactor vessel and steam generating vessel via thermally induced gravity flow, and a secondary coolant flow loop formed between the steam generating vessel and a low pressure turbine. The secondary coolant flow loop is configured and operable to circulate secondary coolant through the steam generating vessel in which the primary coolant heats and converts the secondary coolant from liquid to steam, the steam flowing through the secondary coolant flow loop to the low pressure steam turbine. A temperature differential between primary coolant leaving the steam generating vessel and secondary coolant entering the steam generating vessel is sufficient to induce natural thermally driven gravity circulation of the primary coolant through the primary coolant flow loop.

In another embodiment, a nuclear power generation system includes a steam generator including a steam generating vessel fluidly coupled to a reactor vessel having an internal cavity, a reactor core comprising nuclear fuel disposed within the internal cavity and operable to heat a primary coolant, a primary coolant flow loop formed between the reactor vessel and the steam generating vessel, the primary coolant flow loop being configured and operable to circulate primary coolant through the reactor vessel and steam generating vessel via thermally induced gravity flow, and a secondary coolant flow loop formed between the steam generating vessel and a single steam turbine, the secondary coolant flow loop being configured and operable to circulate secondary coolant through the steam generating vessel in which the primary coolant heats and converts the secondary coolant from liquid to steam. The steam flows through the secondary coolant flow loop to an inlet on the low pressure steam turbine. A condenser is disposed in the secondary coolant flow loop between an outlet from the low pressure turbine and the steam generating vessel, the condenser configured to cool and condense steam exiting the low pressure turbine thereby converting the secondary coolant from steam to liquid. A single feedwater heater is disposed in the secondary coolant flow loop between the condenser and the steam generating vessel, the feedwater heater configured to receive and heat the liquid secondary coolant from the condenser, wherein the secondary coolant flows directly from the feedwater heater into the steam generating vessel without any intervening feedwater heaters between the condenser and the steam generating vessel. A temperature differential between the primary coolant leaving the steam generating vessel and secondary coolant entering the steam generating vessel is sufficient to induce natural thermally driven gravity circulation of the primary coolant through the primary coolant flow loop.

A method for inducing thermally driven gravity flow of primary coolant through a nuclear reactor is provided. The method includes providing a steam generating vessel fluidly coupled to a reactor vessel housing a nuclear fuel core which heats a primary coolant; circulating the primary coolant through a primary coolant flow loop formed between the steam generating vessel and reactor vessel, the primary coolant entering the steam generating vessel from the reactor vessel at a first temperature and exiting the steam generating vessel at a second temperature lower than the first temperature; heating a secondary coolant in the steam generating vessel using the primary coolant which converts the secondary coolant from a liquid entering the steam generating vessel to steam exiting the steam generating vessel, the secondary coolant entering the steam generating vessel at a third temperature and exiting the steam generating vessel at a fourth temperature higher than the third temperature; circulating the secondary coolant through a secondary coolant flow loop having an external portion outside to the steam generating vessel; expanding the steam in a low pressure steam turbine for producing electric power; condensing the steam in a surface condenser to convert the secondary coolant from steam back into liquid form; heating the liquid secondary coolant received from condenser in a feedwater heater to the third temperature using fluid extracted from the turbine; and flowing the heated liquid secondary coolant from the feedwater heater directly to the steam generating vessel; wherein the temperature differential between the second temperature of the primary coolant and the third temperature of the secondary coolant is selected to induce natural thermally driven gravity circulation of the primary coolant through the primary coolant flow loop.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which.

Figure 1:
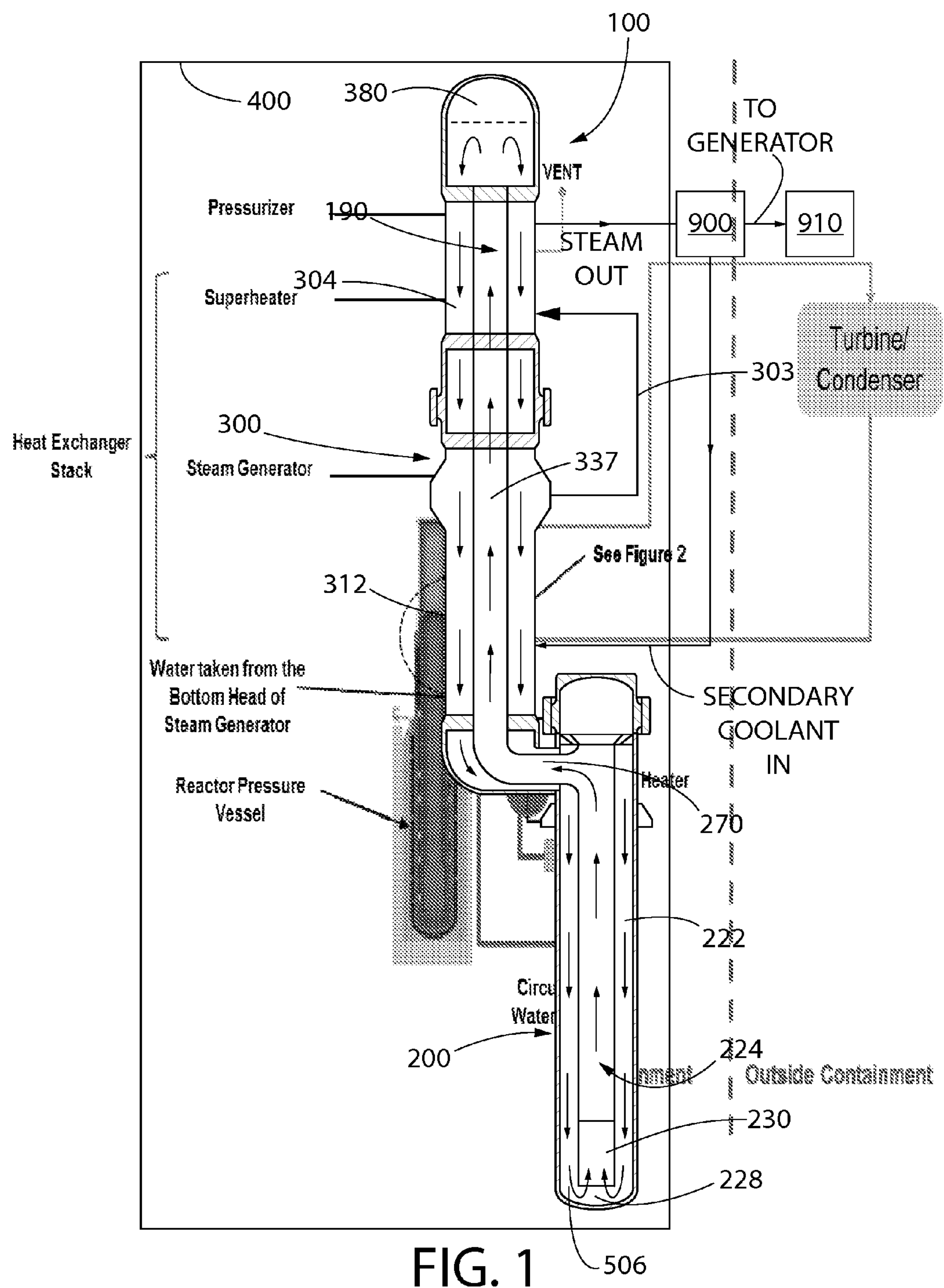
FIG. 1 is front view of a nuclear steam supply system including a reactor vessel and a steam generating vessel according to the present disclosure.

All drawings are schematic and not necessarily to scale.

DETAILED DESCRIPTION OF THE INVENTION

The features and benefits of the invention are illustrated and described herein by reference to non-limiting exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description, and is not intended in any way to limit the scope of the present invention. Relative terms such as “lower,” “upper,” “horizontal,” “vertical,”, “above,” “below” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise.

Referring first to FIG. 1, a nuclear steam supply system 100 is illustrated in accordance with an embodiment of the present invention. Although described herein as being a nuclear steam supply system, the system may also be generally referred to herein as a “steam supply system” for brevity. The inventive nuclear steam supply system 100 is typically used in a nuclear pressurized water reactor. Of course, the nuclear steam supply system 100 can have uses other than for nuclear pressurized water reactors as can be appreciated.

In one embodiment, the nuclear steam supply system 100 generally comprises a reactor vessel 200 and a steam generating vessel 300 fluidly coupled to the reactor vessel. During normal operation of the nuclear steam supply system 100, a primary coolant flows through a primary coolant flow loop 190 within the reactor vessel 200 and the steam generating vessel 300. This primary coolant loop 190 is depicted with arrows in FIG. 1. Specifically, the primary coolant flows upwardly through a riser column 224 in the reactor vessel. 200, from the reactor vessel 200 to the steam generating vessel 300 through a fluid coupling 270, upwardly through a riser pipe 337 in the steam generating vessel 300 to a top of the steam generating vessel 300 (i.e., to a pressurizer 380), and then downwardly through tubes 332 (see FIGS. 3 and 4) in a tube side 304 of the steam generating vessel 300, from the steam generating vessel 300 to the reactor vessel 200 through the fluid coupling 270, downwardly through a downcomer 222 of the reactor vessel 200, and then back from the downcomer 222 of the reactor vessel 200 to the riser column 224 of the reactor vessel 200. The primary coolant continues to flow along this primary coolant loop 190 as desired without the use of any pumps during normal operation of the nuclear steam supply system 100.

During normal operation of the nuclear steam supply system 100, the primary coolant has an extremely high temperature due to its flowing through and heating by the reactor core 230. Specifically, nuclear fuel in the reactor vessel 200 engages in the fission chain reaction, which produces heat and heats the primary coolant as the primary coolant flows through the reactor core of the reactor vessel 200. This heated primary coolant is used to phase-change a secondary coolant from a liquid into steam used to drive the turbine-generator set, as discussed below.

While the primary coolant is flowing through the primary coolant loop 190 during normal operation, the secondary coolant is flowing through a second coolant loop. Specifically, the secondary coolant is introduced into the shell side 305 (FIGS. 3 and 4) of the steam generating vessel 300 at the secondary coolant in location indicated in FIG. 1. The secondary coolant then flows through the shell side 305 (FIGS. 3 and 4) of the steam generating vessel 300 where it is heated by heat transfer from the primary coolant. The secondary coolant is converted into steam due to the heat transfer, and the steam flows from the steam generating vessel 300 to a turbine 900 as indicated in FIG. 1. The turbine 900 drives an electric generator 910 which is connected to the electrical grid for power distribution. The steam then travels from the turbine 900 to a condenser (not illustrated) whereby the steam is cooled down and condensed to form condensate. Thus, the condenser converts the steam back to a liquid condensate (i.e., the secondary coolant) so that it can be pumped back into the steam generator 300 at the secondary coolant inlet location and repeat its flow through the flow path discussed above and be converted back to steam.

In certain embodiments both the primary coolant and the secondary coolant may be water, such as demineralized or borated water. However, the invention is not to be so limited and other liquids or fluids can be used in certain other embodiments, the invention not being limited to the material of the primary and secondary coolants unless so claimed.

The primary coolant continues to flow through the primary coolant loop and the secondary coolant continues to flow in the second coolant loop during normal operation of the nuclear steam supply system 100. The general provision and operation of the convective thermal gravity-driven nuclear steam supply system 100, as well as details of the associated components are described in detail in co-pending International Application No. PCT/US13/38289 filed Apr. 25, 2013, the entirety of which is incorporated herein by reference.

Referring to FIGS. 1-4, the general details of the components and the operation of the nuclear steam supply system 100, and specifically of the reactor vessel 200 and the steam generating vessel 300, will be described. In the exemplified embodiment, the reactor vessel 200 and the steam generating vessel 300 are vertically elongated and separate components which hydraulically are closely coupled, but are discrete vessels in themselves that are thermally isolated except for the exchange of primary coolant (i.e. reactor coolant) flowing between the vessels in the fluid coupling 270 of the primary coolant loop 190 as discussed above. In one non-limiting embodiment, each of the reactor vessel 200 and the steam generating vessel 300 may be made of a corrosion resistant metal such as stainless steel, although other materials of construction are possible.

Figure 2:
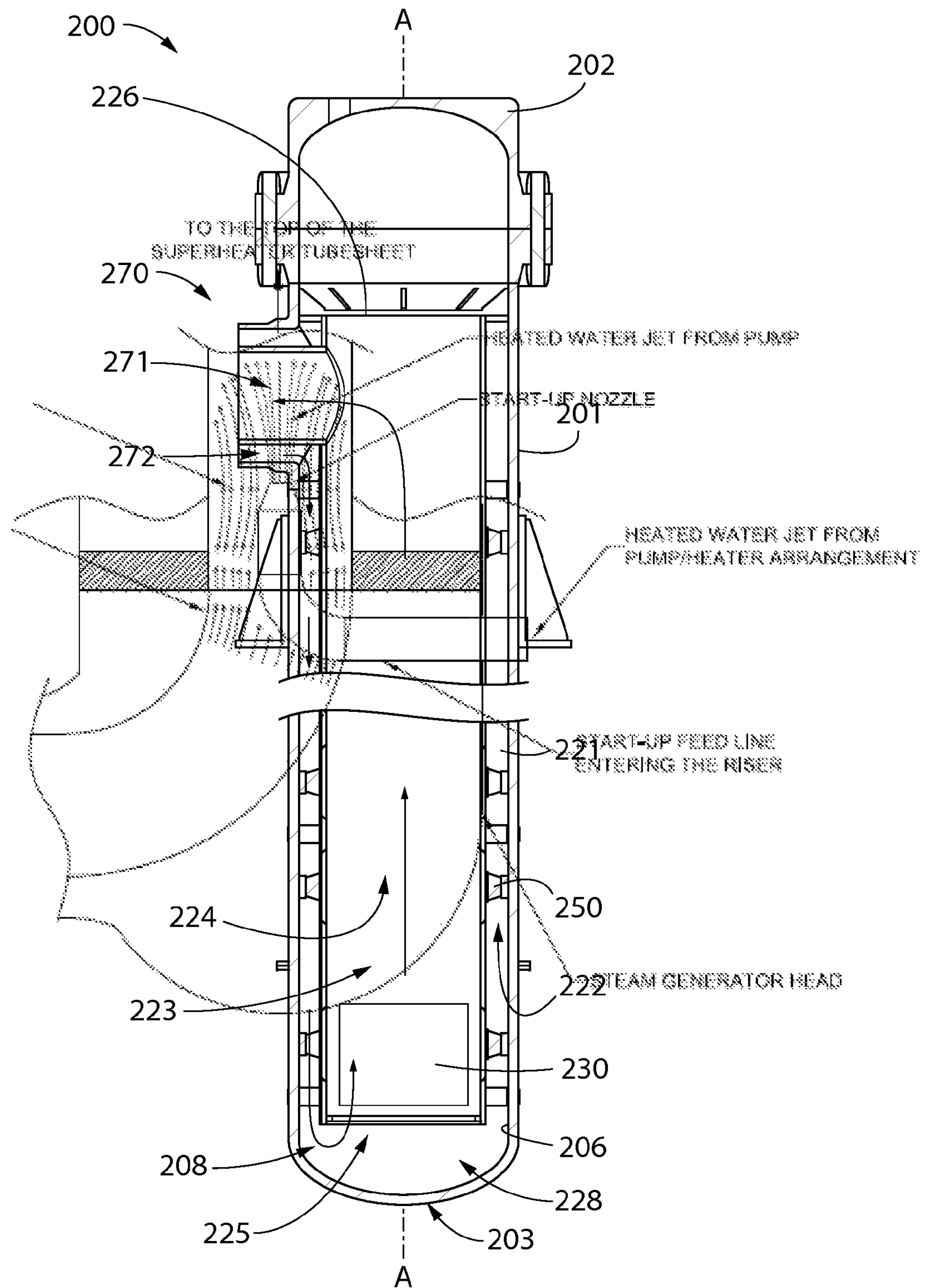
FIG. 2 is an elevation cross-sectional view of the reactor vessel of FIG. 1.

Referring to FIGS. 1 and 2 concurrently, the reactor vessel 200 will be further described. The reactor vessel 200 in one non-limiting embodiment is an ASME code Section III, Class 1 thick-walled cylindrical pressure vessel comprised of a cylindrical sidewall shell 201 with an integrally welded hemispherical bottom head 203 and a removable hemispherical top head 202. The shell 201 defines an internal cavity 208 configured for holding the reactor core which comprises the nuclear fuel. Specifically, the reactor vessel 200 includes a cylindrical reactor shroud 220 which contains the reactor core defined by a fuel cartridge 230 (i.e., nuclear fuel). The reactor shroud 220 transversely divides the shell portion of the reactor vessel into two concentrically arranged spaces: (1) an outer annulus 221 defining the annular downcomer 222 for primary coolant entering the reactor vessel which is formed between the outer surface of the reactor shroud 220 and an inner surface 206 of the shell 201; and (2) a passageway 223 defining the riser column 224 for the primary coolant leaving the reactor vessel 200 heated by fission in the reactor core.

The reactor shroud 220 is elongated and extends in an axial direction along a vertical axis A-A of the reactor vessel 200. The reactor shroud 220 includes an open bottom end 225 and a closed top end 226. In one embodiment, the open bottom end 225 of the reactor shroud 220 is vertically spaced apart by a distance from the bottom head 203 of the reactor vessel 200 thereby forming a bottom flow plenum 228 between the bottom end 225 of the reactor shroud 220 and the bottom head 203 of the reactor vessel 200. As will be discussed in more detail below, during flow of the primary coolant through the primary coolant loop 190, the bottom flow plenum 228 collects the primary coolant from the annular downcomer 222 and directs the primary coolant flow into the inlet of the riser column 224 formed by the open bottom end 225 of the reactor shroud 220.

In certain embodiments, the reactor shroud 220 is a double-walled cylinder which may be made of a corrosion resistant material, such as without limitation stainless steel. This double-wall construction of the reactor shroud 220 forms an insulated structure designed to retard the flow of heat across it and forms a smooth vertical riser column 224 for upward flow of the primary coolant heated by the fission in the fuel cartridge 230 ("core"), which is preferably located at the bottom extremity of the shroud 220 in one embodiment as shown in FIG. 2. The vertical space above the fuel cartridge 230 in the reactor shroud 220 may also contain interconnected control rod segments along with a set of "non-segmental baffles" that serve to protect them from flow induced vibration during reactor operations. The reactor shroud 220 is laterally supported by the reactor vessel by support members 250 to prevent damage from mechanical vibrations that may induce failure from metal fatigue.

In certain embodiments, the fuel cartridge 230 is a unitary autonomous structure containing upright fuel assemblies, and is situated in a region of the reactor vessel 200 that is spaced above the bottom head 203 so that a relatively deep plenum of water lies underneath the fuel cartridge 230. The fuel cartridge 230 is insulated by the reactor shroud 220 so that a majority of the heat generated by the fission reaction in the nuclear fuel core is used in heating the primary coolant flowing through the fuel cartridge 230 and adjoining upper portions of the riser column 224. In certain embodiments, the fuel cartridge 230 is an open cylindrical structure including cylindrically shaped sidewalls, an open top, and an open bottom to allow the primary coolant to flow upward completely through the cartridge (see directional flow arrows, described in detail above with specific reference to FIG. 1). In one embodiment, the sidewalls of the fuel cartridge 230 may be formed by multiple arcuate segments of reflectors which are joined together by suitable means. The open interior of the fuel cartridge 230 may be filled with a support grid for holding the nuclear fuel rods and for insertion of control rods into the core to control the fission reaction as needed.

In the interconnecting space between the reactor vessel 200 and the steam generating vessel 300 there is a fluid coupling 270 that comprises an inner flow path 271 and an outer flow path 272 that concentrically surrounds the inner flow path 271. As will be discussed in more detail below, during flow of the primary coolant the primary coolant flows upwardly within the riser column 224 and through the inner flow path 271 of the fluid coupling 270 to flow from the reactor vessel 200 to the steam generating vessel 300. After the primary coolant gets to the top of the steam generating vessel 300, the primary coolant begins a downward flow through the steam generating vessel 300 and then flows through the outer flow path 272 from the steam generating vessel 300 and into the downcomer 222 of the reactor vessel 200. Again, this flow path will be described in more detail below.

Figure 3:
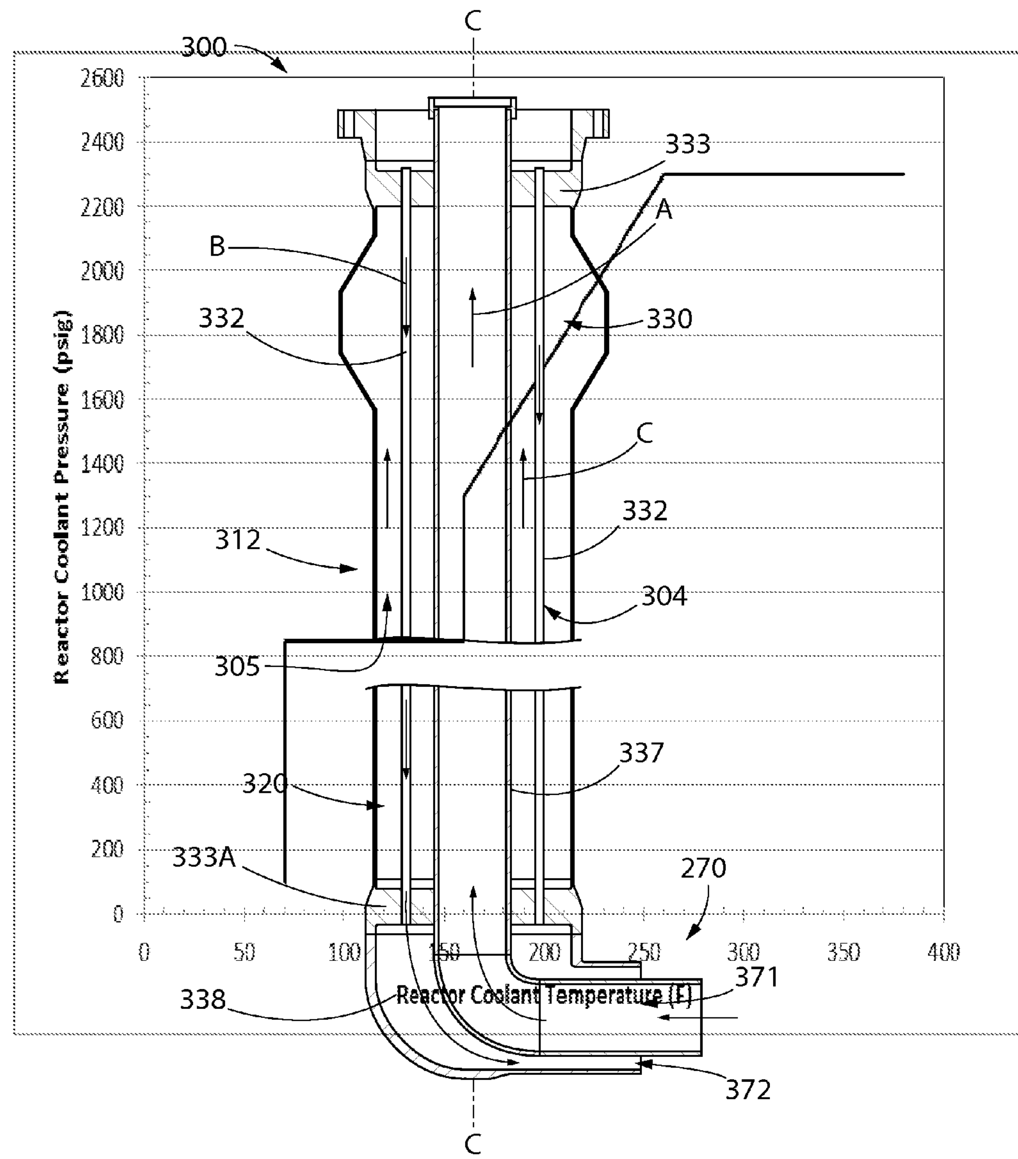
FIG. 3 is an elevation cross-sectional view of the bottom portion of the steam generating vessel of FIG. 1.
Figure 4:
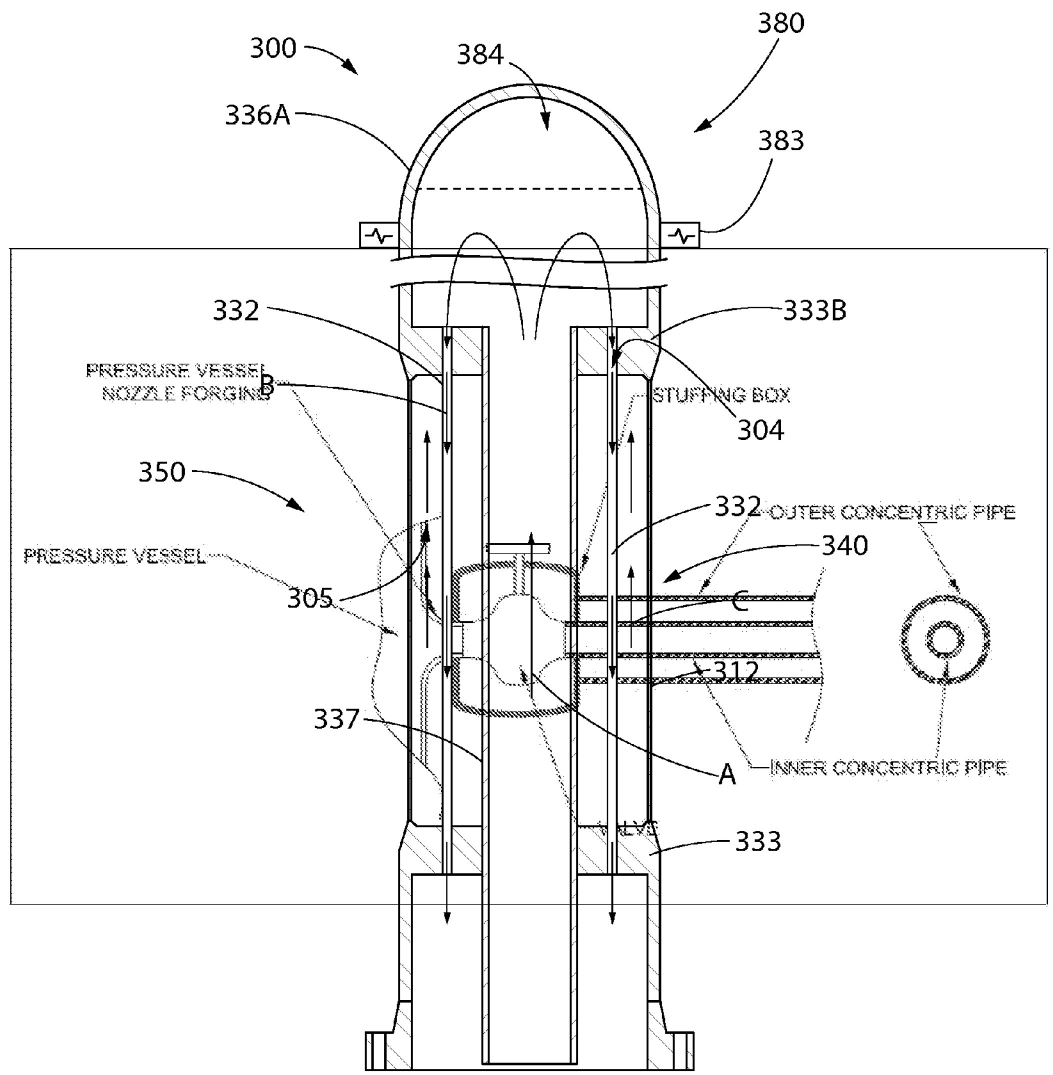
FIG. 4 is an elevation cross-sectional view of the top portion of the steam generating vessel of FIG. 1.
Figure 5:
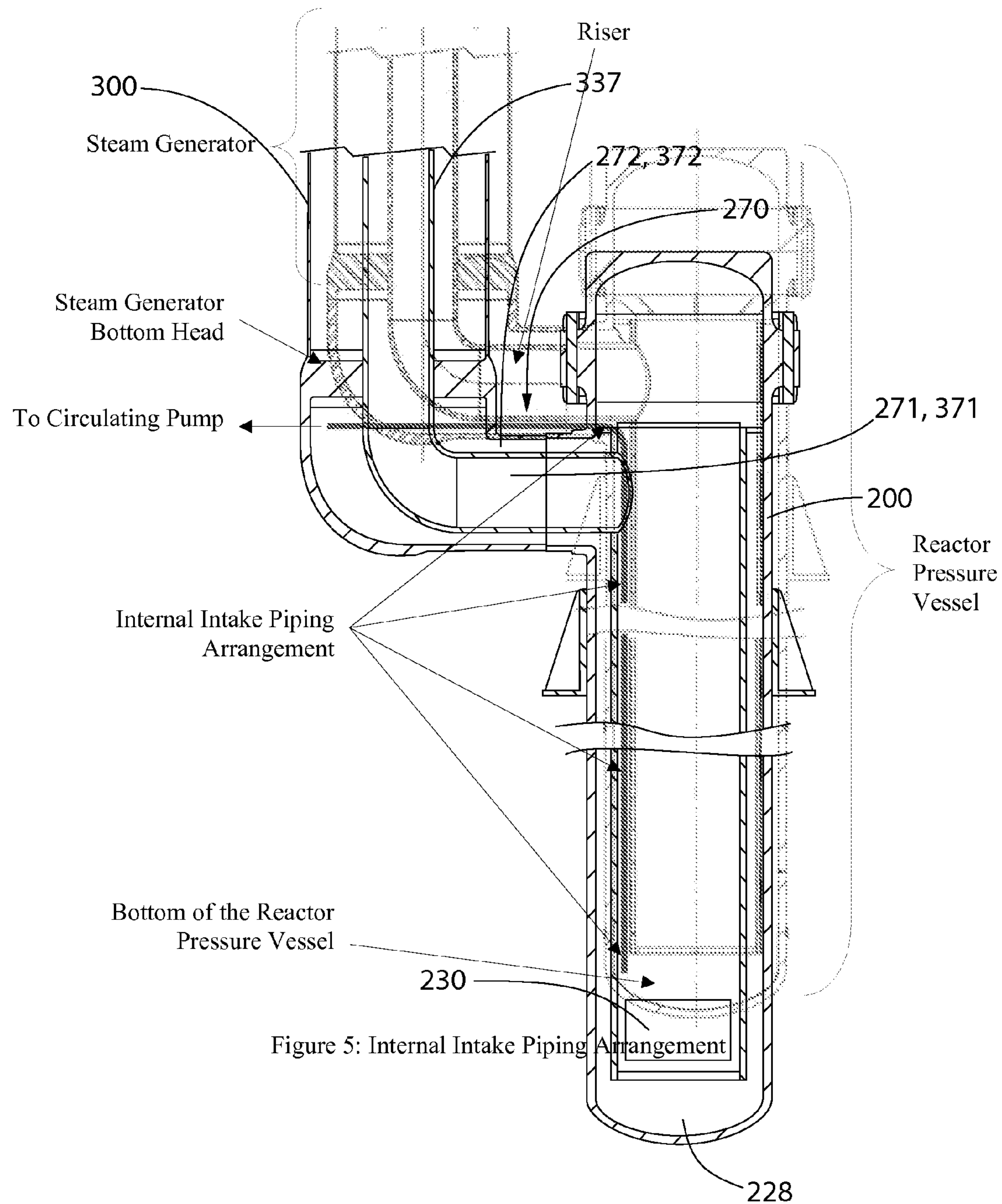
FIG. 5 is a close-up view of the reactor vessel and lower portion of the steam generating vessel of FIG. 1 illustrating the hydraulic and fluid coupling between the steam generating vessel and reactor vessel of the primary coolant flow loop.

Turning now to FIGS. 1, 3, and 4, the details of the steam generating vessel 300 will be described in more detail. In certain embodiments, the steam generating vessel 300 includes a preheater section 320, a steam generator section 330, a superheater section 340 and a pressurizer 380. However, the invention is not to be so limited and one or more of the sections of the steam generating vessel 300 may be omitted in certain other embodiments. Specifically, in certain embodiments, the preheater section 320 may be omitted, or instead may be formed as an integral part of the secondary coolant inlet portion of the steam generator section. 330 without separate discrete tubesheets. In this latter arrangement, liquid secondary coolant from the feedwater heater 540 (see FIG. 6) still enters the preheater section 320 in liquid phase (thereby defining the "preheater") and is converted to steam in an above portion of steam generator section 330 (thereby differentiating and defining the "steam generator section"). In other possible embodiments, the preheater section 320 may include separate tubesheets of its own which physically terminate and defines the limits of the preheater section.

Figure 6:
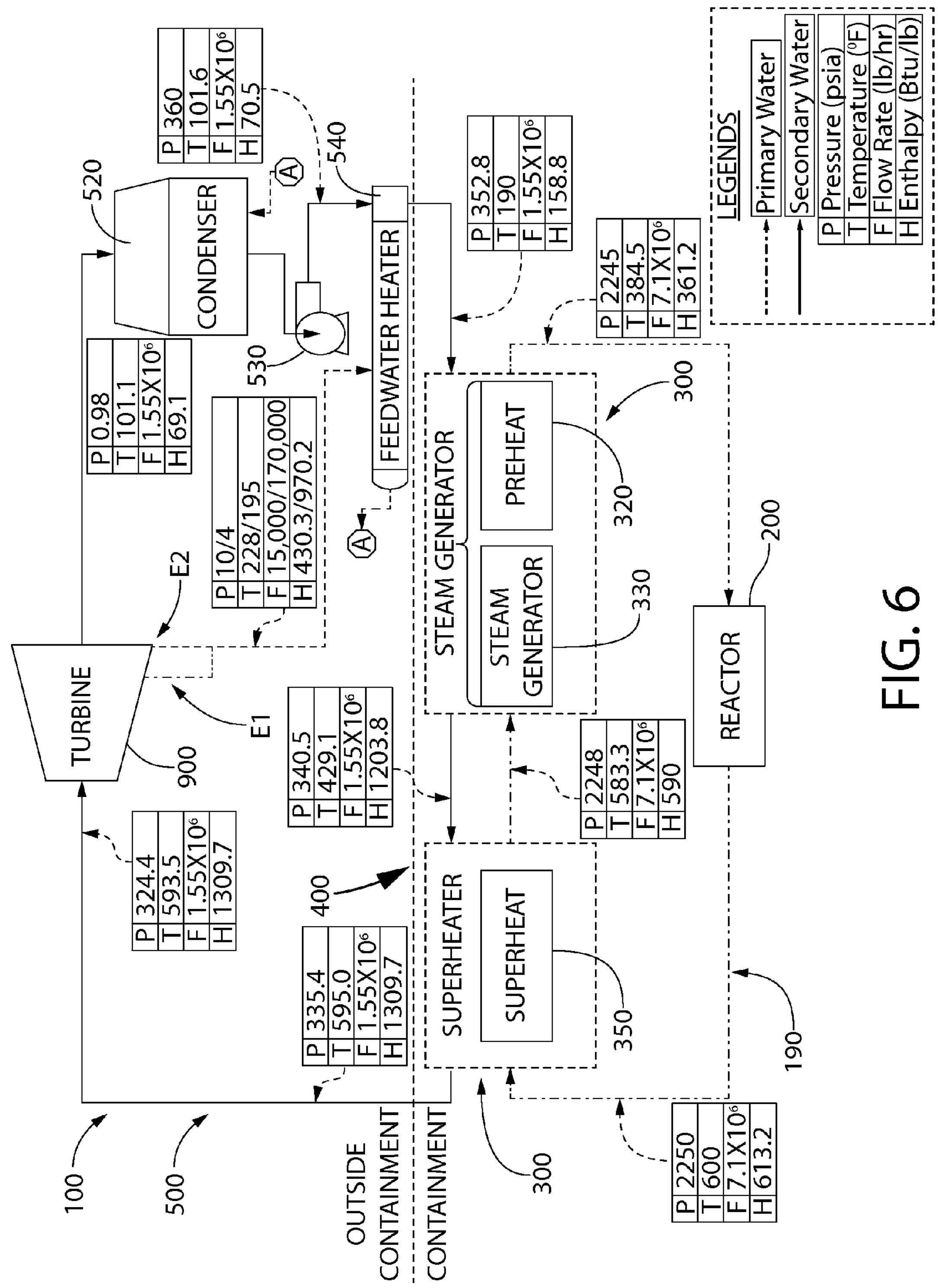
FIG. 6 is a schematic flow diagram showing the primary coolant flow loop and one embodiment of a secondary coolant flow loop according to the present disclosure comprising the power generation cycle portion of the nuclear power generation plant.

A steam bypass loop 303 may be provided on shell side of steam generating vessel 300 (see, e.g. FIG. 1) to route saturated steam from the steam generator section 330 upwards to the superheater section 340 around the intermediate tubesheet structure as shown. As discussed above, it is within the steam generator vessel 300 that the secondary coolant that is flowing through the shell side 305 of the steam generator vessel 300 is converted from a liquid phase (i.e. secondary coolant liquid inlet shown in FIG. 1) to a superheated steam phase that is sent to the turbine 900 through secondary coolant flow loop 500 (secondary coolant steam outlet shown in FIG. 1) for electricity generation via generator 910. The secondary coolant flows in the second coolant loop 500 through the shell side of the steam generating vessel 300, out to the turbine 900, from the turbine 900 to a condenser 520, through a single feedwater heater 540, and then back into the shell side of the steam generating vessel 300, as shown in FIG. 6 and further described herein.

In the exemplified embodiment, each of the preheater 320, the steam generator 330, and the superheater 350 sections are tubular heat exchangers having a tube side 304 and a shell side 305. The tube side 304 of the tubular heat exchangers include a tube bundle comprising a plurality of parallel straight tubes 332 and tubesheets 333 disposed at the extremities or ends of each tube bundle that support the tubes. In the exemplified embodiment, only two tubes 332 are illustrated for clarity; however, it will be appreciated that an actual installation may include tens, hundreds, or thousands of tubes 332 within each of the sections of the steam generating vessel 300. In certain embodiments, a bottommost one of the tubesheets 333A is located in the preheater section 320 or in the steam generator section 330.

The preheater 320, steam generator 330, and superheater 350 sections form vertically stacked heat exchangers disposed within the vertically elongated steam generating vessel 300. In certain embodiments, the preheater section 320, steam generator section 330, and superheater section 350 are configured and arranged to form a parallel counter-flow type heat exchanger arrangement in which the secondary coolant (Rankine cycle) flows upwards on the shell side in an opposite, but parallel direction to the downwards flowing primary coolant on the tube side (see FIGS. 1, 3, and 4). The primary coolant, however, flows upwards in riser pipe 337 in the same direction and parallel to the flowing secondary coolant. Specifically, the arrows labeled A indicate the flow direction of the primary coolant through the riser pipe 337 that is positioned within the steam generating vessel 300, the arrows labeled B indicate the flow direction of the primary coolant through the tubes 332 of the steam generating vessel 300, and the arrows labeled C indicate the flow direction of the secondary coolant through the shell side 305 of the steam generating vessel 300. The trio of the foregoing tubular heat exchangers (i.e. preheater, steam generator, and superheater) are hydraulically connected in series on both the tube side 304 (primary coolant) and the shell side 305 (the secondary coolant forming the working fluid of the Rankine Power Cycle which changes phase from liquid to superheated, gas in the steam generating vessel 300). It should be noted that the portion of primary coolant flowing upwards in riser pipe 337 in the same direction and parallel to the flowing secondary coolant in the steam generating vessel 300 prior to entering the tubes 332 in the pressurizer 380 may contribute slightly to heating the secondary coolant. However, the primary heat transfer occurs across the tube 332 walls between the hot primary coolant flowing inside tubes 332 and secondary coolant flowing outside the tubes.

In the exemplified embodiment, the steam generating vessel 300 includes a top 310, a bottom 311, an axially extending cylindrical shell 312, and the internal riser pipe 337 which is concentrically aligned with the shell 312 and in the exemplified embodiment lies on a centerline C-C of the steam generating vessel 300. The tubes 332 are circumferentially arranged around the outside of the riser pipe 337 between the riser pipe 337 and the shell 312 in sections of the steam generating vessel 300 which include the preheater 320, the steam generator 330, and the superheater 350. In one embodiment, the riser pipe 337 extends completely through all of the tubesheets 333 associated with the preheater 320, the steam generator 330, and the superheater 350 from the top of the steam generating vessel 300 to the bottom to form a part of the continuous primary coolant loop 190 between the reactor vessel 200 and the steam generating vessel 300 all the way to the pressurizer 380.

The fluid coupling 270 includes an inner flowpath 371 and an outer flowpath 372 on the steam generating vessel 300 side of the fluid coupling 270. The inner flowpath 371 is fluidly coupled to the inner flow path 271 and the outer flowpath 372 is fluidly coupled to the outer flowpath 272.

Thus, via these operable couplings the steam generating vessel 300 is fluidly coupled to the reactor vessel 200 to complete the primary coolant loop 190 for flow of the primary coolant through both the reactor vessel 200 and the steam generating vessel 300. An annular space is formed between the riser pipe 337 and the shell 312, which forms a bottom plenum 338. The bottom plenum 338 collects and channels the primary coolant from the steam generating vessel 300 back to the reactor vessel 200 via the outer flow paths 272, 372. Thus, in the exemplified embodiment the primary coolant flows from the reactor vessel 200 to the steam generating vessel 300 through the inner flow paths 271, 371 and the primary coolant flows from the steam generating vessel 300 to the reactor vessel 200 through the outer flow paths 272, 372. However, the invention is not to be so limited and in other embodiments the use of the flow paths 271, 272, 371, 372 can be reversed The superheater 350 is topped by a pressurizer 380 as shown in FIGS. 1 and 4, which is in fluid communication with both the top or outlet of the riser pipe 337 and the inlet to the tubes 332 of the superheater 350. In one embodiment, the pressurizer 380 is mounted directly to the shell 312 of the steam generating vessel 300 and forms a top head 336*a* on the shell. In one embodiment, the pressurizer has a domed or hemispherical head and may be welded to the shell 312, or alternatively bolted in other possible embodiments. The pressurizer 380 forms an upper plenum which collects reactor primary coolant rising through riser pipe 337 and distributes the primary coolant from the riser pipe 337 to the superheater tubes 332. In certain embodiments, the pressurizer 380 includes a heating/quenching element 38. (i.e. water/steam) for pressure control of the reactor primary coolant.

Shown schematically in FIG. 4, the heating/quenching element 383 is comprised of a bank of electric heaters which are installed in the pressurizer section that serve to increase the pressure by boiling some of the primary coolant and creating a steam bubble that resides at the top of the pressurizer near the head (above the liquid/gas interface 340 represented by the dashed line). A water spray column 384 is located near the top head 336*a* of the pressurizer 380 which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 380 and the heating/quenching element 383 may be without limitation about 2,250 psi. In alternative embodiments, as noted above, the liquid/gas interface 340 is formed between an inert gas, such as nitrogen (N2) supplied by supply tanks (not shown) connected to the pressurizer 380, and the liquid primary coolant.

In one embodiment, the external surfaces of the tubes 332 may include integral fins for increasing the heat transfer rates between the hot primary coolant and secondary coolant. The superheater tube bundle is protected from erosion (i.e. by tiny water droplets that may remain entrained in the up-flowing steam) by ensuring that the steam flow is counter-flow being parallel along, rather than across, the tubes 332 in the tube bundle.

In the exemplified embodiment, the nuclear steam supply system 100 including the reactor vessel 200 and the steam generating vessel 300 are housed within a containment structure or vessel 400. This ensures that in the event of a loss-of-coolant accident during start-up, all of the high energy fluids are contained within the containment boundary of the containment vessel 400. The details of the containment vessel 400 can be found in PCT/US13/42070, filed on May 21, 2013, the entirety of which is incorporated herein by reference. The Rankine power cycle components found in the secondary coolant flow loop including turbine-generator set 900-910 may be mounted outside the containment.

By definition, a passively safe nuclear steam supply system as disclosed herein does not include or require any 100% primary coolant flow pumps in the primary reactor coolant loop because the flow is driven by gravity, not mechanical pumps. In a passively cooled reactor, natural circulation flow will be sustained even after the reactor shutdown control rods are fully inserted into the core.

Secondary Coolant Flow Loop (Power Cycle)

FIG. 6 is a schematic diagram showing the primary coolant flow loop and one embodiment of secondary coolant flow loop according to the present disclosure. The primary coolant flow loop 190 includes the reactor vessel 200 and related components already described herein. The secondary coolant flow loop 500 circulates secondary coolant via pumped flow and includes portions both inside and outside the containment vessel 400. The secondary coolant flow loop 500 includes a flow conduit (e.g. piping) for fluidly coupling components together and circulating secondary coolant in both a steam state (i.e. saturated and superheated) and a liquid state (e.g. condensate or feedwater) through the power generation equipment described herein including a turbine-generator set and auxiliary plant equipment which define a Rankine power cycle.

It should be noted that FIG. 6 illustrates some representative, but non-limiting examples of optimized primary coolant and secondary coolant conditions at various points in the steam supply system 100 in one possible configuration and operating mode of the system. The invention is expressly not limited to the operating conditions shown, which represents one of many possibly nuclear plant steam supply system operating scenarios falling within the scope of the present disclosure.

Referring to FIG. 6, secondary coolant flow loop 500 is generally a one-directional flow circuit including (in order along the flow path) the steam generating vessel 300 (e.g. preheat section 320, steam generator section 330, and superheater section 350), a low pressure steam turbine 900 coupled to a generator 910 (shown in FIG. 1), a condenser 520, feedwater pump 530, and a feedwater heater 540. In one embodiment, a single feedwater heater 540 is provided in the secondary coolant flow loop as further described herein. Steam leaves the steam, generating vessel 300 in a superheated state and flows through suitable steam piping of the secondary coolant flow loop 500 to an inlet on steam turbine 900 in which the steam expands and drives a plurality of rotating turbine blades. The turbine rotor is coupled to the generator 910 for producing electric current. Accordingly, in the present non-limiting embodiment being described, the secondary coolant flow loop consists of only a single low pressure turbine (e.g. no high pressure turbine) and a single feedwater heater.

The steam generating vessel 300 according to the present disclosure produces steam at a relatively low pressure, but with considerable superheat for feeding a single low pressure turbine 900. Advantageously, this eliminates the need for a high pressure turbine which is generally more vulnerable to operational failures and reliability concerns due to higher operating conditions. In standard commercial nuclear plants, for example, such high pressure turbines typically may require steam at a moderately high pressure (e.g. 700 to 1000 psi) and with little or no superheat. A Rankine cycle according to the present disclosure therefore has a turbine-generator set consisting of a single low pressure steam turbine 900 coupled to the generator 910.

To provide low pressure, high superheat steam to turbine 900, steam generating vessel 300 is configured and designed to produce and supply steam to low pressure turbine 900 at a pressure less than 400 psia, and in some preferred embodiments at a maximum pressure of about 350 psia. In the exemplary non-limiting power cycle illustrated in FIG. 6, the steam has a pressure of about 335 psia leaving the steam generating vessel 300 and about 325 psia at the inlet of the turbine 900 (the difference attributable to frictional pressure loss in the steam, piping between the steam generating vessel and turbine). Steam leaving the steam generating vessel 300 and entering the low pressure turbine 900 may be at least 575 degrees F. and in a superheated state. In the exemplary non-limiting power cycle illustrated in FIG. 6, the steam has a temperature of about 595 degrees F. An acceptable steam temperature range of about and including 575-615 degrees F. may be used while maintaining the low pressure steam requirements of the turbine 900. In one preferred embodiment, the steam may have a superheat of at least 170 degrees F. for optimum cycle efficiency.

Due to significant initial superheat of steam entering the low pressure turbine 900, the MSRs may be completely eliminated and the multitude of feedwater heaters (e.g. 16 in a typical nuclear plant with high pressure steam turbines) may be replaced in one embodiment with a single feedwater heater 540 which draws steam and/or water (i.e. "extraction fluid") from one or more extraction points on the low pressure turbine. The extracted steam provides the heating medium which heats the condensate/feedwater in feedwater heater 540 collected by the condenser. The feedwater heater 540 may draw steam at one or more extraction points each located on the turbine 900 to remove wet saturated steam. In one embodiment, each steam extraction point may be located on the turbine 900 at points which are at sub-atmospheric pressures (i.e. less than 14.7 psia) where air in-leakage through turbine glands is most likely to occur. In one embodiment, two sub-atmospheric extraction points may be used. A first steam extraction point E1 may be at less than 14.7 psia, and a second steam extraction point E2 may be at less than 10 psia. In one representative but no n-limiting example, the first extraction point may be about 10 psia and the second extraction point may be about 4 psia. The first steam extraction point removes generally wet saturated steam from the turbine 900 which serves to dry the cycle steam to enable it to complete the last stages of expansion in the turbine with an acceptable level of moisture to minimize droplet impingement on and wet steam erosion of the turbine blades. The second steam extraction point E2 removes extremely wet steam and/or liquid (water) secondary coolant from turbine 900. Representative but non-limiting optimal steam and/or water extraction fluid rates are noted in FIG. 6. In one embodiment, the extraction or flow rate (pounds/hour) for the lower pressure steam extraction point E2 preferably may be more than E1, and in some embodiments more than ten times E1. Extraction point E1 also has a correspondingly higher temperature, enthalpy (BTU/pound), and pressure (psia) than point E2 since the extraction fluid at E1 is withdrawn upstream of E2 from turbine 900 where the secondary coolant steam has more energy.

In another possible embodiment, one above atmospheric pressure steam extraction point E1 and one sub-atmospheric steam extraction point E2 may be used. Some non-limiting representative pressures for extraction points E1, E2 may be about 20 psia and 10 psia, respectively which are optimal for this arrangement. These two extraction points serve the same foregoing purposes. Feedwater heater 540 receives steam from both extraction points E1, E2 and is suitably engineered to prevent back flow of steam and flashing of the condensate in the drain lines.

Because the steam extraction occurs in the sub-atmospheric portion of the turbine in at least one of the extraction points E1, E2 where the air in-leakage is most likely to occur, the extraction steam also serves to carry the non condensibles out of the turbine space, delivering them to the feedwater heater 540 where it is segregated and exhausted using conventional vacuum apparatus. Thus, the power cycle is purged of deleterious non-condensibles which is a collateral benefit of sub-atmospheric steam extraction and feedwater heating described herein.

Feedwater heater 540 may be an elongated shell and tube heat exchanger with condensate pumped from condenser 520 by feedwater pump 530 flowing on the tube side and extraction fluid (i.e. steam and/or water) from the low pressure steam turbine 900 flowing on the shell side. Although the extraction fluid from extraction points E1 and E2 is shown in FIG. 6 as flowing in a single combined flow conduit to feedwater heater 540, the extracted fluids preferably are not be combined and isolated from each other flowing in separate piping lines to the feedwater heater each having a separate inlet nozzle on the shell for introducing this heating fluid. It should be noted that the exemplary non-limiting extraction fluid conditions shown in the associated box in FIG. 6 include two sets of numbers for each parameter; the first number being for extraction point E1 fluid and the second being for the lower pressure extraction point E2 fluid.

Feedwater heater 540 may be any suitable type of shell and tube heat exchanger. In one embodiment shown in FIG. 6, the feedwater heater may be a U-tube bundle design with a single channel, and tubesheet ("head") disposed at one end of the heater. Such designs are well known in the art without undue elaboration. Essentially, the channel at the head of the heater defines an internal cavity which is internally divided by a partition plate into feedwater (secondary coolant) inlet and outlet flow boxes each in fluid communication with the single tubesheet. The U-shaped tubes have one end fluidly coupled to the tubesheet adjacent the inlet flow box and the other end fluidly coupled to the tubesheet adjacent the outlet flow box. The U-shaped bends in the tubes are disposed in the heater opposite the tubesheet and head. In other possible designs, the feedwater heater 540 may have a straight tube bundle extending between two tubesheets disposed at either end of the heater, analogous to the steam generating vessel 300 heat exchanger design described herein. Either type of heater design is suitable and may be used.

The extracted and condensed secondary coolant heating medium on the shell side of feedwater heater 540 may be collected and returned to condenser 520 in one embodiment.

Condenser 520 is a steam surface condenser configured to receive and condense exhaust steam (secondary coolant) from turbine 900, which is then collected in a wet well in the condenser from which feedwater pump 530 takes suction. Surface condensers of this type are well known without undue elaboration. Condenser 520 may be of any suitable design used in the industry. Feedwater pump 530 pressurizes and pumps the condensate or feedwater (terms may be used interchangeably herein to refer to the condensed liquid secondary coolant) from condenser 520 to the head of feedwater heater 540 through suitable piping. Feedwater pump 530 may be any suitable type of pump, including for example without limitation centrifugal pumps, vertical axial pumps, etc.

It should be noted that because the feedwater heating of the condensate or feedwater outside of the steam generating vessel 300 in the secondary coolant loop 500 is minimal, a preponderant amount of heating of the condensate or feedwater occurs in the steam generator vessel which enables the reactor primary coolant to be cooled to much lower temperature leaving the steam generator 300 (e.g. about 375-385 degrees F. in one non-limiting example) than in a typical nuclear plant (e.g. about 500 degrees F.). Advantageously, this has the effect of boosting the natural convective thermosiphon action in the gravity-driven reactor primary coolant loop circulation design disclosed herein. The primary coolant may be decreased in temperature by at least 200 degrees in one embodiment (i.e. entering versus leaving the steam generating vessel 300). The secondary coolant may correspondingly be increased in temperature by at least 350 degrees F. (i.e. entering versus leaving the steam generating vessel 300), and in some embodiments by at least 400 degrees F. The greater the temperature difference between the primary and secondary coolant flowing through the heat exchangers of the steam generating vessel 300, the greater the thermal siphon effect and circulation rate of the primary coolant through the primary coolant flow loop. The vertical orientation of the steam generating vessel 300 and reactor vessel 200 further beneficially contribute to the thermal gravity primary coolant flow based generally on the principle that hot water rises and cold water falls.

With reference to FIG. 6, the temperature differential between the primary coolant leaving the steam generating vessel 300 (at the preheater 320) and liquid secondary coolant (feedwater) entering the steam generating vessel (at the preheater) preferably is sufficient to induce and boost the convective thermally-driven gravity circulation of the primary coolant through the steam generating vessel and reactor vessel 200. In one embodiment, the temperature difference between the primary coolant leaving the steam generating vessel and secondary coolant entering the steam generating vessel is at least 175 degrees F. which boosts the thermal-siphon gravity flow effect. An acceptable range of the liquid secondary coolant feedwater leaving feedwater heater 540 may be between about and including 170-210 degrees F. which flows directly to the steam generating vessel 300. An acceptable corresponding range of primary coolant leaving the preheater section 320 of the steam generating vessel 300 may be between about and including 365-405 degrees F.

The nuclear steam generating system and Rankine cycle operation according to the present disclosure will now be summarized. On the secondary coolant side, the method includes converting the secondary coolant from liquid phase to superheated steam using the heat exchangers in the steam generating vessel in the manner as already described. To summarize, liquid secondary coolant flows and enters the preheating section 320 from the external portion of the secondary coolant flow loop 500 directly from the feedwater heater 540 without any intervening heating. The secondary coolant has a first inlet temperature. There are no other heaters in the external loop which perform heating of the liquid secondary coolant between the steam turbine and the inlet to the steam generating vessel (noting that the condenser 420 further cools the secondary coolant). The liquid secondary coolant flows upwards through the steam generating vessel 300 first through the steam generator section 330 where it is converted to steam, then finally through the superheater section 350 where the steam becomes superheated in state. The superheated steam exits the steam generating vessel 300 at a higher second outlet temperature than the first inlet temperature and re-enters the external portion of the secondary coolant flow loop.

On the primary coolant side, the primary coolant from the reactor vessel initially enters the steam generating vessel at a first temperature and flows upwards to the pressurizer 380 and enters the tube-side of the superheater section 350. The primary coolant flows downwards in order through the superheater section 350, steam generator section 330, and preheater section 320 where the primary coolant exits the steam generating vessel 300 and returns to the reactor vessel 200. The primary coolant, having lost and transferred heat to the secondary coolant to convert the secondary coolant from liquid to superheated steam, exits the steam generating vessel 300 at a second lower outlet temperature than the inlet temperature.

The secondary coolant is cooled in the external portion of the secondary coolant flow loop 500. The secondary coolant leaving the steam generating vessel 300 in the form of superheated steam flows into the low pressure steam turbine 900 at a pressure less than 400 psia in one embodiment. The corresponding steam temperature may be may be at least 575 degrees F. in one embodiment, as already described above. The steam flows through the turbine 900, the condenser 520, feedwater pump 530, feedwater heater 540, and directly back to the inlet of the steam generating vessel 300 and preheater section 320. The secondary coolant has lost a significant portion of its heat energy (and thus temperature) to drive the turbine which is converted into electrical energy.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A nuclear power generation system including:

a steam generator including a vertically elongated steam generating vessel fluidly coupled to a reactor vessel having an internal cavity;

a reactor core comprising nuclear fuel disposed within the internal cavity and operable to heat a primary coolant;

a primary coolant flow loop formed between the reactor vessel and the steam generating vessel, the primary coolant flow loop being configured and operable to circulate primary coolant through the reactor vessel and steam generating vessel via thermally induced gravity flow; and a secondary coolant flow loop formed between the steam generating vessel and a low pressure turbine, the secondary coolant flow loop being configured and operable to circulate secondary coolant through the steam generating vessel in which the primary coolant heats and converts the secondary coolant from liquid to steam, the steam flowing through the secondary coolant flow loop to the low pressure steam turbine;

wherein a temperature differential between the primary coolant leaving the steam generating vessel and secondary coolant entering the steam generating vessel is at least 175 degrees F. sufficient to induce natural thermally driven gravity circulation of the primary coolant through the primary coolant flow loop;

wherein the pressure of steam entering the low pressure turbine is less than 400 psia; and wherein the secondary coolant flow loop does not include a high pressure turbine.

2. The nuclear power generation system of claim 1, wherein the temperature of steam entering the low pressure turbine has a temperature of at least 575 degrees F. and is superheated steam.

3. The nuclear power generation system of claim 1, further comprising a single feedwater heater disposed in the secondary coolant flow loop between an outlet from the low pressure turbine and the steam generating vessel, the feedwater heater configured to heat the secondary coolant using secondary coolant extracted from the low pressure turbine;

wherein the secondary coolant flow loop does not include any additional feedwater heaters between the low pressure turbine outlet and the steam generating vessel.

4. The nuclear power generation system of claim 3, further comprising:

a condenser disposed in the secondary coolant flow loop between an outlet from the low pressure turbine and the steam generating vessel; and a single feedwater heater disposed in the secondary coolant flow loop between the condenser and the steam generating vessel, wherein the secondary coolant flow loop does include any additional feedwater heaters between the condenser and the steam generating vessel.

5. The nuclear power generation system of claim 4, wherein the steam generating vessel and reactor vessel are disposed inside a containment vessel, and the turbine, condenser, and feedwater heater are disposed outside the containment vessel.

6. The nuclear power generation system of claim 4, wherein secondary coolant is heated in the feedwater heater using secondary coolant extracted from the low pressure feedwater heater at two different extraction points having different secondary coolant temperatures and pressures.

7. The nuclear power generation system of claim 1, wherein the primary coolant flows through the reactor pressure vessel to cool the reactor core and through the steam generating vessel to transfer heat to a secondary coolant flowing through the steam generating vessel.

8. The nuclear power generation system of claim 1, wherein the steam generating vessel includes a vertically stacked preheat section, main steam generating section, and a superheater section.

9. A nuclear power generation system including:

a steam generator including a vertically elongated steam generating vessel fluidly coupled to a reactor vessel having an internal cavity;

a reactor core comprising nuclear fuel disposed within the internal cavity and operable to heat a primary coolant;

a primary coolant flow loop formed between the reactor vessel and the steam generating vessel, the primary coolant flow loop being configured and operable to circulate primary coolant through the reactor vessel and steam generating vessel via thermally induced gravity flow;

a secondary coolant flow loop formed between the steam generating vessel and a single steam turbine, the secondary coolant flow loop being configured and operable to circulate secondary coolant through the steam generating vessel in which the primary coolant heats and converts the secondary coolant from liquid to steam, the steam flowing through the secondary coolant flow loop to an inlet on the single steam turbine;

a condenser disposed in the secondary coolant flow loop between an outlet from the single turbine and the steam generating vessel, the condenser configured to cool and condense steam exiting the single turbine thereby converting the secondary coolant from steam to liquid; and a single feedwater heater disposed in the secondary coolant flow loop between the condenser and the steam generating vessel, the feedwater heater configured to receive and heat the liquid secondary coolant from the condenser, wherein the secondary coolant flows directly from the feedwater heater into the steam generating vessel without any intervening feedwater heaters between the condenser and the steam generating vessel;

wherein a temperature differential between the primary coolant leaving the steam generating vessel and secondary coolant entering the steam generating vessel is sufficient to induce natural thermally driven gravity circulation of the primary coolant through the primary coolant flow loop; and wherein the single steam turbine is a low pressure turbine characterized by steam entering the turbine at a pressure less than 400 psia.

10. The nuclear power generation system of claim 9, wherein the secondary coolant flow loop does not include any additional turbines.

11. The nuclear power generation system of claim 9, wherein the steam is superheated.

12. The nuclear power generation system of claim 9, wherein the temperature of steam entering the steam turbine has a temperature of at least 575 degrees F. and is superheated steam.

13. The nuclear power generation system of claim 9, wherein a temperature differential between primary coolant leaving the steam generating vessel and secondary coolant entering the steam generating vessel is at least 175 degrees F.

14. The nuclear power generation system of claim 13, wherein the temperature differential is between and including 175-215 degrees F.

15. The nuclear power generation system of claim 9, wherein the secondary coolant is heated in the feedwater heater using secondary coolant extracted from the turbine at two different extraction points, at least one of the extraction points being at sub-atmospheric pressure.

16. The nuclear power generation system of claim 15, wherein each of the extraction points is at sub-atmospheric pressure.

17. The nuclear power generation system of claim 9, wherein the feedwater heater is a shell and tube heat exchanger, colder secondary coolant from the condenser flowing on the tube side and hotter secondary coolant at least partially in steam form extracted from turbine flowing on the shell side for heating the tube side secondary coolant.

18. The nuclear power generation system of claim 17, wherein the secondary coolant extracted from the turbine is at sub-atmospheric pressure.

19. The nuclear power generation system of claim 9, wherein the steam generating vessel includes vertically stacked heat exchangers comprising a preheat section, a steam generator section, and a superheater section, the secondary coolant being converted from liquid to superheated steam flowing upwards through the steam generating vessel.

20. A method for inducing thermally driven gravity flow of primary coolant through a nuclear reactor, the method comprising:

providing a vertically elongated steam generating vessel fluidly coupled to a reactor vessel housing a nuclear fuel core which heats a primary coolant;

circulating the primary coolant through a primary coolant flow loop formed between the steam generating vessel and reactor vessel, the primary coolant entering the steam generating vessel from the reactor vessel at a first temperature and exiting the steam generating vessel at a second temperature lower than the first temperature;

heating a secondary coolant in the steam generating vessel using the primary coolant which converts the secondary coolant from a liquid entering the steam generating vessel to steam exiting the steam generating vessel, the secondary coolant entering the steam generating vessel at a third temperature and exiting the steam generating vessel at a fourth temperature higher than the third temperature;

circulating the secondary coolant through a secondary coolant flow loop having an external portion outside to the steam generating vessel;

expanding the steam in a single steam turbine for producing electric power;

condensing the steam in a surface condenser to convert the secondary coolant from steam back into liquid form;

heating the liquid secondary coolant received from condenser in a single feedwater heater to the third temperature using fluid extracted from the turbine; and flowing the heated liquid secondary coolant from the feedwater heater directly to the steam generating vessel without any intervening feedwater heaters between the condenser and the steam generating vessel;

wherein the temperature differential between the second temperature of the primary coolant and the third temperature of the secondary coolant is at least 175 degrees F. selected to induce natural thermally driven gravity circulation of the primary coolant through the primary coolant flow loop; and wherein the single steam turbine is a low pressure turbine characterized by steam entering the turbine at a pressure less than 400 psia.

* * * * *